United States Patent Office 2,843,631
Patented July 15, 1958

2,843,631

METHOD FOR THE PRODUCTION OF UNSATURATED ALDEHYDES

Otto Isler, Marc Montavon, and Rudolf Rüegg, Basel, and Paul Zeller, Neualschwil, near Basel, Switzerland, assignors to Hoffmann-La Roche Inc., Nutley, N. J., a corporation of New Jersey No Drawing. Application May 29, 1956
Serial No. 587,932

Claims priority, application Switzerland May 31, 1955

11 Claims. (Cl. 260—598)

This invention relates to a method of producing unsaturated aldehydes. More particularly the invention relates to a method for converting certain unsaturated aldehydes having 11 or 14 carbon atoms to analogous $C_{11}$ or $C_{14}$ unsaturated aldehydes wherein the double bonds are in different positions. Still more particularly the invention relates to a method for converting 2,6,6-trimethyl - 1 - cyclohexylidene - acetaldehyde to 2,6,6-trimethyl - 1 - cyclohexen - 1 - yl - acetaldehyde, 2,6,6-trimethyl - 2 - cyclohexen - 1 - ylidene - acetaldehyde to 2,6,6 - trimethyl - 1,3 - cyclohexadien - 1 - yl - acetaldehyde, 4-(2,6,6-trimethyl - 1 - cyclohexylidene)-2-methyl-2 - buten - 1 - al to 4-(2,6,6 - trimethyl - 1 - cyclohexen-1 - yl) - 2 - methyl - 2 - buten - 1 - al and 4-(2,6,6-trimethyl - 2 - cyclohexen - 1 - ylidene) - 2 - methyl-2-buten-1-al to 4-(2,6,6 - trimethyl - 1,3 - cyclohexadien-1-yl)-2-methyl-2-buten-1-al, respectively. Certain intermediates produced in the synthesis of the above compounds are novel and these are also within the scope of this invention.

The overall process in general comprises acetalizing a member of the group consisting of 2,6,6 - trimethyl - 1-cyclohexylidene - acetaldehyde, 2,6,6 - trimethyl-2-cyclohexen - 1 - ylidene - acetaldehyde, 4-(2,6,6 - trimethyl-1-cyclohexylidene) - 2 - methyl-2-buten-1-al and 4-(2,6,6-trimethyl - 2 - cyclohexen - 1 - ylidene) - 2 - methyl - 2-buten-1-al by treatment with a tri-lower alkyl ester of a lower orthoalkanoic acid in the presence of an acid condensation agent to obtain the di-lower alkyl acetal of the starting aldehyde, splitting off from the acetal thus obtained one mol of alcohol, for example by treatment with phosphorus pentoxide or with phosphorus oxychloride or with acetic anhydride in the presence of an organic base, thereby producing an enol ether and hydrolyzing the enol ether under acid conditions to obtain the desired aldehyde having the double bonds in different positions from the starting material.

The first step of the process of this invention in detail comprises acetalizing 2,6,6 - trimethyl - 1 - cyclohexylidene - acetaldehyde, 2,6,6 - trimethyl - 2 - cyclohexen-1-ylidene - acetaldehyde, 4-(2,6,6 - trimethyl - 1 - cyclohexylidene) - 2 - methyl - 2 - buten - 1 - al or 4-(2,6,6-trimethyl - 2 - cyclohexen - 1 - ylidene) - 2 - methyl - 2-buten - 1 - al, respectively, to obtain 1,1 - di - loweralkoxy - 2 - (2,6,6 - trimethyl - 1 - cyclohexylidene) - ethane, 1,1 - di - loweralkoxy - 2 - (2,6,6 - trimethyl - 2-cyclohexen - 1 - ylidene) - ethane, 1,1-di-loweralkoxy-4 - (2,6,6 - trimethyl - 1 - cyclohexylidene) - 2 - methyl-2 - butene or 1,1-di-loweralkoxy - 4 - (2,6,6 - trimethyl-2 - cyclohexen - 1 - ylidene) - 2 - methyl - 2 - butene, respectively. The acetalization is effected, for example, by reacting the aldehyde to be converted with a tri-lower alkyl ester of a lower orthoalkanoic acid, preferably the methyl, ethyl or n-butyl esters of orthoformic acid in the presence of an acid condensation agent such as boron trifluoride etherate, zinc chloride, ammonium nitrate, phosphoric acid, p-toluenesulfonic acid, etc. The acetals obtained are colorless or yellowish oils. The acetal obtained in the first step may be further purified, if desired, by distillation, for example, but it can be used directly in the next stage of the process without purification.

In the second step of the process according to this invention, one mol of alcohol is split off from the acetal produced in the preceding stage for the purpose of converting it into an enol ether. For example, the acetal may be treated with phosphorus pentoxide in the presence of an organic base. According to a preferred embodiment the acetal, in an inert solvent such as toluene, petroleum ether, etc., is heated to 80–110° C. with an equivalent amount of phosphorus oxychloride in the presence of an excess of pyridine. According to another preferred embodiment the acetal is heated in the presence of a tertiary organic base, such as pyridine, in an inert solvent, such as toluene, with acetic anhydride and the acetic acid ester formed is continuously removed from the reaction mixture by distillation. In this manner, the 1,1-di-loweralkoxy - 2 - (2,6,6 - trimethyl - 1-cyclohexylidene)-ethane, 1,1-di-loweralkoxy - 2 - (2,6,6-trimethyl - 2 - cyclohexen - 1 - ylidene) - ethane, 1,1-di-loweralkoxy - 4 - (2,6,6 - trimethyl - 1 - cyclohexylidene)-2-methyl - 2 - butene or 1,1-di-loweralkoxy - 4 - (2,6,6-trimethyl - 2 - cyclohexen - 1 - ylidene) - 2 - methyl - 2-butene are converted and rearranged to 1-loweralkoxy-2 - (2,6,6 - trimethyl - 1 - cyclohexen - 1 - yl) - ethylene, 1 - loweralkoxy - 2 - (2,6,6 - trimethyl - 1,3 - cyclohexadien - 1 - yl) - ethylene, 1-loweralkoxy - 4 - (2,6,6 - trimethyl - 1 - cyclohexen - 1 - yl) - 2 - methyl - 1,3 - butadiene or 1-loweralkoxy - 4 - (2,6,6 - trimethyl - 1,3-cyclohexadien-1-yl)-2-methyl-1,3-butadiene, respectively. The enol ethers obtained are colorless to yellowish, distillable oils, which show characteristic absorption maxima in the ultraviolet spectrum. The oils thus obtained may be further purified, for example, by distillation, but this is not necessary for use in the next step of the process.

The third step of this method comprises hydrolyzing the enol ether obtained in the second stage in aqueous medium under acid conditions. For the hydrolysis mineral acids such as hydrochloric acid, sulfuric acid, phosphoric acid, and organic acids such as acetic acid, p-toluenesulfonic acid, etc. are especially applicable. The reaction mixture may be added to a water-miscible solvent such as methyl alcohol, ethyl alcohol, acetone, dioxane, etc. in order to obtain a homogeneous reaction mixture. Preferably, the enol ether is heated several minutes with 90% aqueous acetic acid at 90–110° C. or boiled for a short time in 90% aqueous ethyl alcohol in the presence of a small amount of sulfuric acid.

Thus, the 1-loweralkoxy - 2 - (2,6,6 - trimethyl - 1-cyclohexen - 1 - yl) - ethylene, 1-loweralkoxy - 2 - (2,6,6-trimethyl-1,3-cyclohexadien - 1 - yl) - ethylene, 1-loweralkoxy - 4 - (2,6,6 - trimethyl - 1 - cyclohexen - 1 - yl) - 2-methyl - 1,3 - butadiene or 1-loweralkoxy - 4 - (2,6,6-trimethyl - 1,3 - cyclohexadien - 1 - yl) - 2 - methyl - 1,3-butadiene are converted to the products 2,6,6-trimethyl-1 - cyclohexen - 1 - yl - acetaldehyde, 2,6,6 - trimethyl-1,3 - cyclohexadien - 1 - yl - acetaldehyde, 4-(2,6,6 - trimethyl - 1 - cyclohexen - 1 - yl) - 2 - methyl - 2 - buten-1-al or 4-(2,6,6-trimethyl - 1,3 - cyclohexadien - 1 - yl) - 2-methyl-2-buten-1-al, respectively.

4 - (2,6,6 - trimethyl - 1 - cyclohexen - 1 - yl) - 2-methyl-2-buten-1-al is useful as an intermediate for the synthesis of vitamin A and β-carotene. 4-(2,6,6-trimethyl-1,3 - cyclohexadien - 1 - yl) - 2 - methyl - 2 - butene - 1 - al is an intermediate for the synthesis of vitamin $A_2$ and carotenoids. 2,6,6-trimethyl - 1 - cyclohexen - 1 - yl-acetaldehyde and 2,6,6 - trimethyl - 1,3 - cyclohexadien-1-yl-acetaldehyde are useful in perfume materials having fruity odors, the former reminiscent of α-ionone, the second one reminiscent of gooseberries.

Example 1

To 250 parts by volume of dry liquid ammonia were added 0.05 part by weight of ferric nitrate, and a few minutes later while stirring 0.05 part by weight of lithium. Dry air was blown into the blue solution for one minute. Then 2.05 parts by weight of lithium were added slowly, with a wait after each addition until the blue color of the solution disappeared. Thereupon 18.7 parts by weight of β-chlorovinyl ethyl ether were added while stirring well, and then ten minutes later 17 parts by weight of 2,6,6-trimethyl-cyclohexanone were dropped in slowly. The mixture was stirred for 44 hours, then slowly reacted with 22.5 parts by weight of ammonium chloride, and finally the ammonia was allowed to evaporate. 400 parts by volume of diethyl ether were then added and the mixture was filtered. The ethereal solution was dried over sodium sulfate, concentrated and the residue was distilled. The distillate was dissolved in 150 parts by volume of high boiling petroleum ether and shaken with 5 parts by weight of a lead poisoned palladium catalyst in a hydrogen atmosphere at room temperature until the hydrogen uptake ceased. The catalyst was filtered off, the petroleum ether solution was concentrated and the residue was shaken for 1½ hours at room temperature with a mixture of 100 parts by volume of dioxane, 17.5 parts by volume of 3 N sulfuric acid and 7.5 parts by volume of water. The mixture was then diluted with water, the product was taken up in petroleum ether and the petroleum ether was washed with dilute sodium bicarbonate solution and water, dried over sodium sulfate and concentrated. Upon distillation of the residue there was obtained 2,6,6-trimethyl-1-cyclohexylidene-acetaldehyde, boiling point 102° C./11 mm., $n_D^{23}=1.4938$, U. V. maximum at 237 m$\mu$ (in petroleum ether).

A solution of 110 parts by weight of 2,6,6-trimethyl-1-cyclohexylidene-acetaldehyde in 120 parts by volume of orthoformic acid ethyl ester was treated with a solution of 2 parts by volume of orthophosphoric acid in 18 parts by volume of absolute alcohol and permitted to stand at 20 to 25° C. for 15 hours. 20 parts by volume of pyridine were added and the mixture was poured over a mixture of 200 parts by weight of 5% sodium bicarbonate solution and 100 parts by weight of ice. The mixture was extracted with petroleum ether, agitated with sodium bicarbonate solution and dried over potash. After concentration of the petroleum ether solution, the residue was freed in vacuo at 70° C. from excess orthoformic acid ethyl ester and the formic acid ethyl ester produced. The residue, 1,1-diethoxy-2-(2,6,6-trimethyl-1-cyclohexylidene)-ethane, showed no absorption maximum over 225 m$\mu$ in the ultraviolet spectrum, $n_D^{23}=1.464$.

27 parts by weight of 1,1-diethoxy-2-(2,6,6-trimethyl-1-cyclohexylidene)-ethane were added to to a mixture of 11 parts by volume of phosphorus oxychloride, 38 parts by volume of pyridine and 100 parts by volume of toluene and the mixture was heated with vigorous stirring for 2 hours at 95° C. The reaction mixture was then cooled, poured over 100 parts by weight of ice and 100 parts by volume of 5% sodium bicarbonate solution and shaken well. The toluene solution was separated, washed with 100 parts by volume of 5% sodium bicarbonate solution and dried over sodium sulfate. After evaporating the solvent, the residue was distilled in vacuo. The 1-ethoxy-2-(2,6,6-trimethyl-1-cyclohexen-1-yl)-ethylene, boiling point 104–106° C./13 mm., $n_D^{25}=1.482$, showed an ultraviolet absorption maximum at 223 m$\mu$ (in petroleum ether solution).

15 parts by weight of 1-ethoxy-2-(2,6,6-trimethyl-1-cyclohexen-1-yl)-ethylene were dissolved in 40 parts by volume of methyl alcohol, treated with a solution of 0.4 part by weight of p-toluene sulfonic acid in 4 parts by volume of water and refluxed for 60 minutes. The solution was diluted with 80 parts by volume of ice water and extracted with petroleum ether. This was then washed with aqueous sodium bicarbonate solution, dried over sodium sulfate and the solvent was distilled off. The residue was then distilled in vacuo to obtain 2,6,6-trimethyl-1-cyclohexen-1-yl-acetaldehyde, boiling point 98° C./12 mm., $n_D^{27}=1.478$; the substance showed no absorption maximum in the ultraviolet spectrum over 220 m$\mu$.

Example 2

The procedure described in the first paragraph of Example 1 was followed except that 17 parts by weight of 2,6,6-trimethyl-2-cyclohexen-1-one (prepared from 2,6,6-trimethyl-cyclohexanone by bromination and then dehydrohalogenating by heating with pyridine) was used as starting material in lieu of the ketone used in Example 1. After hydrogenation the catalyst was filtered off and the petroleum ether solution was shaken with 150 parts by volume of water and 15 parts by volume of 3 N hydrochloric acid for 16 hours at room temperature. Thereupon the petroleum ether solution was separated, washed with dilute sodium bicarbonate solution and water, dried over sodium sulfate and the solvent was evaporated off. Upon distillation of the residue there was obtained 2,6,6-trimethyl-2-cyclohexen-1-ylidene-acetaldehyde, boiling point 112–115° C./11 mm., $n_D^{22.5}=1.5353$, U. V. maximum at 278.5 m$\mu$ (in petroleum ether).

A solution of 16 parts by weight of 2,6,6-trimethyl-2-cyclohexen-1-ylidene-acetaldehyde in 18 parts by volume of orthoformic acid ethyl ester was treated with a solution of 0.3 part by volume of orthophosphoric acid in 3 parts by volume of absolute ethanol and permitted to stand at 20 to 25° C. for 15 hours. 5 parts by volume of pyridine were then added and the mixture was poured over a mixture of 20 parts by weight of 5% sodium bicarbonate solution and 10 parts by weight of ice. It was extracted with petroleum ether, shaken with sodium bicarbonate solution and dried over potassium carbonate. After concentration of the petroleum ether solution, the residue was freed in vacuo at 70° C. of excess orthoformic acid ethyl ester and of formic acid ethyl ester produced. The 1,1-diethoxy-2-(2,6,6-trimethyl-2-cyclohexen-1-ylidene)-ethane was pure enough for further use in the process. By distillation of the crude product there was obtained a colorless product, boiling point 130–132° C./13 mm., $n_D^{23}=1.4805$, U. V. absorption maximum at 240 m$\mu$ (in petroleum ether solution).

29 parts by weight of 1,1-diethoxy-2-(2,6,6-trimethyl-2-cyclohexen-1-ylidene)-ethane were treated with 12 parts by volume of phosphorus oxychloride, 41 parts by volume of pyridine and 120 parts by volume of toluene, worked up and distilled as described in Example 1. The 1-ethoxy-2-(2,6,6-trimethyl-1,3-cyclohexadien-1-yl)-ethylene obtained, boiling point 107–109° C./13 mm., $n_D^{25}=1.502$, showed a U. V. absorption maximum at 285 m$\mu$ (in petroleum ether solution).

9 parts by weight of 1-ethoxy-2-(2,6,6-trimethyl-1,3-cyclohexadien-1-yl)-ethylene were refluxed with 90 parts by volume of ethyl alcohol and 10 parts by volume of 3 N sulfuric acid for 90 minutes. The mixture was then poured over 150 parts by weight of ice water and extracted with petroleum ether. The petroleum ether solution was washed with 100 parts by volume of 5% sodium bicarbonate solution, dried over sodium sulfate and the solvent was distilled off. The residue was distilled in vacuo to obtain 2,6,6-trimethyl-1,3-cyclohexadien-1-yl-acetaldehyde, boiling point 104–108° C./12 mm., $n_D^{24}=1.498$, U. V. absorption maximum at 268 m$\mu$ (in petroleum ether solution).

Example 3

2,6,6-trimethyl-1-cyclohexylidene-acetaldehyde was acetalized by reaction with orthoformic acid triethyl ester in the presence of p-toluene sulfonic acid thereby forming 1,1-diethoxy-(2,6,6-trimethyl-1-cyclohexylidene)-ethane. The latter was condensed with ethyl propenyl ether in the presence of zinc chloride thereby forming 4-(2,6,6 - trimethyl - 1 - cyclohexylidene) - 2 - methyl - 1,1,3-triethoxy-butane. Upon hydrolysis-dealcoholation of the latter by heating with acetic acid and sodium acetate to 100° C., 4-(2,6,6-trimethyl-1-cyclohexylidene)-2-methyl-2-buten-1-al was produced.

A solution of 77 parts by weight of 4-(2,6,6-trimethyl-1-cyclohexylidene)-2-methyl-2-buten-1-al in 85 parts by volume of orthoformic acid ethyl ester was treated with a solution of 1.5 parts by volume of orthophosphoric acid in 15 parts by volume of absolute ethanol and permitted to stand at 20–25° C. for 15 hours. 10 parts by volume of pyridine were added and the mixture was poured over a mixture of 100 parts by weight of 5% sodium bicarbonate solution and 60 parts by weight of ice. The mixture was extracted with petroleum ether, shaken with sodium carbonate solution and dried over potassium carbonate. After concentration of the petroleum ether solution, the residue was freed in vacuo at 70° C. from excess orthoformic acid ethyl ester and the formic acid ethyl ester which was produced. The 1,1 - diethoxy - 4 - (2,6,6 - trimethyl - 1 - cyclohexylidene)-2-methyl-2-butene obtained was pure enough for further processing, $n_D^{23}$=1.4885, U. V. absorption maximum at 247–248 m$\mu$ (in petroleum ether solution).

100 parts by weight of 1,1-diethoxy-4-(2,6,6-trimethyl-1 - cyclohexylidene)-2-methyl-2-butene were treated with 35.5 parts by volume of phosphorus oxychloride, 125 parts by volume of pyridine and 380 parts by volume of toluene and worked up as described in Example 1. The crude 1 - ethoxy-4-(2,6,6-trimethyl-1-cyclohexen-1-yl)-2-methyl-1,3-butadiene obtained was pure enough for further processing. By distillation of the crude product there was obtained the colorless product, boiling point 76° C./0.02 mm., $n_D^{19}$=1.518, U. V. absorption maximum at 262 to 263 m$\mu$ (in petroleum ether solution).

32 parts by weight of 1-ethoxy-4-(2,6,6-trimethyl-1-cyclohexen - 1 - yl) - 2-methyl-1,3-butadiene were treated with 90 parts by volume of ethyl alcohol in 10 parts by volume of 10% orthophosphoric acid and refluxed for 1 hour. The reaction mixture was then poured onto 200 parts by weight of ice and extracted with petroleum ether. The petroleum ether solution was washed with 100 parts by volume of 5% sodium bicarbonate solution, dried over sodium sulfate and the solvent was distilled off. The 4 - (2,6,6 - trimethyl - 1-cyclohexen-1-yl)-2-methyl-2-buten-1-al obtained, boiling point 86° C./0.05 mm., $n_D^{24}$=1.510, showed a U. V. absorption maximum at 226 m$\mu$ (in petroleum ether solution).

The aldehyde thus obtained may be converted to vitamin A by known methods.

*Example 4*

β-Ionone was subjected to a glycide ester synthesis with ethyl chloro acetate and the glycide ester was treated with alkali to produce 4-(2,6,6-trimethyl-1-cyclohexen-1-yl)-2-methyl-2-buten-1-al. The latter was brominated with N-bromsuccinimide and the bromination product was treated with quinoline to split out HBr thereby producing 4 - (2,6,6 - trimethyl - 2 - cyclohexen - 1 - ylidene) - 2 - methyl-2-buten-1-al.

A solution of 49.5 parts by weight of 4-(2,6,6-trimethyl-2-cyclohexen-1-ylidene)-2-methyl-2-buten-1-al in 54 parts by volume of orthoformic acid ethyl ester was treated with a solution of 1 part by volume of orthophosphoric acid in 9 parts by volume of absolute ethanol and permitted to stand at 20–25° C. for 15 hours. 10 parts by volume of pyridine were added and the reaction mixture was poured over a mixture of 100 parts by weight of 5% sodium bicarbonate solution and 60 parts by weight of ice. The mixture was extracted in petroleum ether, shaken with sodium bicarbonate solution and dried over potassium carbonate. After concentration of the petroleum ether solution, the residue was freed in vacuo at 70° C. of excess orthoformic acid ethyl ester and the formic acid ethyl ester produced. The residue, 1,1-diethoxy - 4 - (2,6,6 - trimethyl - 2 - cyclohexen - 1 - ylidene) - 2 - methyl - 2-butene, $n_D^{22}$=1.5155, showed a U. V. absorption maximum at 284.5 m$\mu$ (in petroleum ether solution).

31 parts by weight of 1,1-diethoxy-4-(2,6,6-trimethyl-2-cyclohexen-1-ylidene)-2-methyl-2-butene were treated with 11 parts by volume of phosphorus oxychloride, 38 parts by volume of pyridine and 120 parts by volume of toluene and worked up as described in Example 1. By distillation in vacuo there was obtained 1-ethoxy-4-(2,-6,6 - trimethyl - 1,3 - cyclohexadien - 1 - yl) - 2 - methyl - 1,3 - butadiene, boiling point 92–94° C./0.06 mm., $n_D^{27}$=1.555, U. V. absorption maxima at 243 and 312 m$\mu$ (in petroleum ether solution).

20 parts by weight of 1-ethoxy-4-(2,6,6-trimethyl-1,3-cyclohexadien-1-yl)-2-methyl-1,3-butadiene were treated with 120 parts by volume of acetone and 12 cc. of 30% sulfuric acid and heated at 70° C. for 120 minutes. The reaction mixture was cooled and diluted with 300 parts by volume of ice water and extracted with petroleum ether. The petroleum ether solution was washed first with water and then with 5% sodium bicarbonate solution, dried with sodium sulfate and the solvent was distilled off. By distillation in vacuo there was obtained 4 - (2,6,6 - trimethyl - 1,3 - cyclohexadien - 1 - yl) - 2 - methyl - 2-buten-1-al, boiling point 80° C./0.05 mm., $n_D^{22}$=1.530, U. V. absorption maxima at 226 and 268 m$\mu$ (in petroleum ether solution).

The 4-(2,6,6 - trimethyl-1,3 - cyclohexadien-1 - yl) - 2 - methyl-2-buten-1-al may then be converted to vitamin A$_2$, for example, by the following multi-stage process: (1) 4-(2,6,6-trimethyl-1,3-cyclohexadien-1-yl)-2-methyl-2-buten-1-al is condensed with 1-hydroxy-3-methyl-2-penten-4-yne in a metallo-organic reaction to obtain 1,6-dihydroxy-3,7-dimethyl-9-(2,6,6 - trimethyl-1,3 - cyclohexadien-1-yl)-2,7-nonadien-4-yne, (2) the last named compound is partially hydrogenated on the triple bond (i. e. the triple bond is reduced to a double bond), (3) the nonatriene obtained in step (2) is esterified by treatment with an acylating agent, e. g. acetic anhydride, (4) the ester obtained in step (3) is dehydrated while simultaneously effecting allyl rearrangement, e. g. by treatment with phosphorus oxychloride in the presence of excess pyridine and (5) the vitamin A$_2$ ester thus obtained is treated with an alkali such as potassium hydroxide to produce vitamin A$_2$.

*Example 5*

24 parts by weight of 1,1-diethoxy-2-(2,6,6-trimethyl-1-cyclohexylidene)-ethane (obtained according to the method described in paragraphs 1 and 2 of Example 1) were added to a mixture of 10.2 parts by weight of acetic anhydride, 80 parts by volume of toluene, 7 parts by volume of pyridine and 0.1 part by weight of p-toluenesulfonic acid, and the mixture was heated for some hours at 120–140° C., while a slow stream of nitrogen was introduced therein, under continuous distillation of acetic ethylate. Once approximately 80% of the theoretical amount of acetic ethylate was distilled off, the reaction mixture was cooled, treated with glacial sodium bicarbonate solution and extracted with petroleum ether. The petroleum ether solution was washed twice with cold sodium bicarbonate solution and dried over sodium sulfate; then, the solvent was evaporated in vacuo. The product obtained, 18 parts by weight of 2-ethoxy-2-(2,6,6-trimethyl-1-cyclohexen-1-yl)-ethylene, was pure enough to be hydrolyzed according to the method described in paragraph 4 of Example 1 to obtain 2,6,6-trimethyl-1-cyclohexen-1-yl-acetaldehyde.

Example 6

28 parts by weight of 1,1-diethoxy-4-(2,6,6-trimethyl-1-cyclohexylidene)-2-methyl-2-butene (obtained according to the method described in paragraphs 1 and 2 of Example 3) were added to a mixture of 10.2 parts by weight of acetic anhydride, 80 parts by volume of toluene, 7 parts by volume of pyridine and 0.1 part by weight of p-toluenesulfonic acid, and the mixture was heated for some hours at 120–140° C., while a slow stream of nitrogen was introduced therein, under continuous distillation of ethyl acetate. When approximately 80% of the theoretical amount of acetic ethylate had distilled off, the reaction mixture was cooled, treated with glacial sodium bicarbonate solution and extracted with petroleum ether. The petroleum ether solution was washed twice with cold sodium bicarbonate solution and dried over sodium sulfate; then, the solvent was evaporated in vacuo. The product obtained, 22 parts by weight of crude 1-ethoxy-4-(2,6,6-trimethyl-1-cyclohexen-1-yl)-2-methyl-1,3-butadiene, was pure enough to be hydrolyzed according to the method described in paragraph 4 of Example 3 to obtain 4-(2,6,6-trimethyl-1-cyclohexen-1-yl)-2-methyl-2-buten-1-al.

This application is a continuation-in-part of copending application Serial No. 584,886, filed May 15, 1956, and now abandoned.

We claim:

1. A process which comprises acetalizing a member of the group consisting of 2,6,6-trimethyl-1-cyclohexylidene-acetaldehyde, 2,6,6-trimethyl-2-cyclohexen-1-ylidene-acetaldehyde, 4-(2,6,6-trimethyl-1-cyclohexylidene)-2-methyl-2-buten-1-al and 4-(2,6,6-trimethyl-2-cyclohexen-1-ylidene)-2-methyl-2-buten-1-al, by treatment with a tri-lower alkyl ester of a lower orthoalkanoic acid in the presence of an acid condensation agent to obtain the di-lower alkyl acetal of the aldehyde, splitting off one mol of alcohol from the acetal thus obtained thereby producing an enol ether and hydrolyzing the enol ether under acid conditions.

2. A process which comprises acetalizing a member of the group consisting of 2,6,6-trimethyl-1-cyclohexylidene-acetaldehyde, 2,6,6-trimethyl-2-cyclohexen-1-ylidene-acetaldehyde, 4-(2,6,6-trimethyl-1-cyclohexylidene)-2-methyl-2-buten-1-al and 4-(2,6,6-trimethyl-2-cyclohexen-1-ylidene)-2-methyl-2-buten-1-al, by treatment with orthoformic acid ethyl ester in the presence of an acid condensation agent to obtain the di-ethyl acetal of the aldehyde splitting off one mol of alcohol from the last named acetal by treatment with phosphorus oxychloride in the presence of an organic base thereby producing an enol ether and hydrolyzing the enol ether under acid conditions.

3. A process which comprises acetalizing a member of the group consisting of 2,6,6-trimethyl-1-cyclohexylidene-acetaldehyde, 2,6,6-trimethyl-2-cyclohexen-1-ylidene-acetaldehyde, 4-(2,6,6-trimethyl-1-cyclohexylidene)-2-methyl-2-buten-1-al and 4-(2,6,6-trimethyl-2-cyclohexen-1-ylidene)-2-methyl-2-buten-1-al, by treatment with orthoformic acid ethyl ester in the presence of an acid condensation agent to obtain the di-ethyl acetal of the aldehyde splitting off one mol of alcohol from the last named acetal by treatment with acetic anhydride in the presence of an organic base thereby producing an enol ether and hydrolyzing the enol ether under acid conditions.

4. A process which comprises acetalizing 2,6,6-trimethyl-1-cyclohexylidene-acetaldehyde by treatment with orthoformic acid ethyl ester in the presence of an acid condensation agent to obtain 1,1-diethoxy-2-(2,6,6-trimethyl-1-cyclohexylidene)-ethane, splitting off one mol of alcohol from the last named acetal by treatment with acetic anhydride in the presence of an organic base to produce 1-ethoxy-2-(2,6,6-trimethyl-1-cyclohexen-1-yl)-ethylene and hydrolyzing the last named compound under acid conditions to produce 2,6,6-trimethyl-1-cyclohexen-1-yl-acetaldehyde.

5. A process which comprises acetalizing 2,6,6-trimethyl-2-cyclohexen-1-ylidene-acetaldehyde by treatment with orthoformic acid ethyl ester in the presence of an acid condensation agent to obtain 1,1-diethoxy-2-(2,6,6-trimethyl-2-cyclohexen-1-ylidene)-ethane, splitting off one mol of alcohol from the last named acetal by treatment with acetic anhydride in the presence of an organic base to produce 1-ethoxy-2-(2,6,6-trimethyl-1,3-cyclohexadien-1-yl)-ethylene and hydrolyzing the last named compound under acid conditions to produce 2,6,6-trimethyl-1,3-cyclohexadien-1-yl-acetaldehyde.

6. A process which comprises acetalizing 4-(2,6,6-trimethyl-1-cyclohexylidene)-2-methyl-2-buten-1-al by treatment with orthoformic acid ethyl ester in the presence of an acid condensation agent to obtain 1,1-diethoxy-4-(2,6,6-trimethyl-1-cyclohexylidene)-2-methyl-2-butene, splitting off one mol of alcohol from the last named acetal by treatment with acetic anhydride in the presence of an organic base to produce 1-ethoxy-4-(2,6,6-trimethyl-1-cyclohexen-1-yl)-2-methyl-1,3-butadiene and hydrolyzing the last named compound under acid conditions to produce 4-(2,6,6-trimethyl-1-cyclohexen-1-yl)-2-methyl-2-buten-1-al.

7. A process which comprises acetalizing 4-(2,6,6-trimethyl-2-cyclohexen-1-ylidene)-2-methyl-2-buten-1-al by treatment with orthoformic acid ethyl ester in the presence of an acid condensation agent to obtain 1,1-diethoxy-4-(2,6,6-trimethyl-2-cyclohexen-1-ylidene)-2-methyl-2-butene, splitting off one mol of alcohol from the last named acetal by treatment with acetic anhydride in the presence of an organic base to produce 1-ethoxy-4-(2,6,6-trimethyl-1,3-cyclohexadien-1-yl)-2-methyl-1,3-butadiene and hydrolyzing the last named compound under acid conditions to produce 4-(2,6,6-trimethyl-1,3-cyclohexadien-1-yl)-2-methyl-2-buten-1-al.

8. A process which comprises converting 1,1-di-loweralkoxy-4-(2,6,6-trimethyl-1-cyclohexylidene)-2-methyl-2-butene by splitting off one mol of alcohol to obtain 1-loweralkoxy-4-(2,6,6-trimethyl-cyclohexen-1-yl)-2-methyl-1,3-butadiene.

9. A process which comprises converting 1,1-di-loweralkoxy-4-(2,6,6-trimethyl-2-cyclohexen-1-ylidene)-2-methyl-2-butene by splitting off one mol of alcohol to obtain 1-loweralkoxy-4-(2,6,6-trimethyl-1,3-cyclohexadien-1-yl)-2-methyl-1,3-butadiene.

10. 1-loweralkoxy-4-(2,6,6-trimethyl-1-cyclohexen-1-yl)-2-methyl-1,3-butadiene.

11. 1-loweralkoxy-4-(2,6,6-trimethyl-1,3-cyclohexadien-1-yl)-2-methyl-1,3-butadiene.

References Cited in the file of this patent

Karrer et al.: Helv. Chim. Acta 34, 1408–11 (1951).